United States Patent [19]

Orban

[11] 4,074,170

[45] Feb. 14, 1978

[54] VOLTAGE REGULATOR WITH THERMAL OVERLOAD PROTECTION

[75] Inventor: Jean M. Orban, Santa Monica, Calif.

[73] Assignee: Vivitar Corporation, Santa Monica, Calif.

[21] Appl. No.: 697,869

[22] Filed: June 21, 1976

[51] Int. Cl.[2] ........................ H05B 41/34; H02H 3/06; H02H 5/04

[52] U.S. Cl. .................................... 315/120; 315/127; 315/241 P; 361/103; 320/1; 354/128; 354/145

[58] Field of Search .................. 315/127, 136, 241 R, 315/241 P, 120; 320/1, 36, DIG. 1; 354/145, 127, 128; 361/103, 105

[56] References Cited

U.S. PATENT DOCUMENTS

| | | | |
|---|---|---|---|
| 3,588,595 | 6/1971 | Silvers | 315/127 |
| 3,679,991 | 7/1972 | Wilwerding | 315/241 R X |
| 3,688,659 | 9/1972 | Takishima et al. | 315/241 P X |

*Primary Examiner*—Alfred E. Smith
*Assistant Examiner*—Charles F. Roberts
*Attorney, Agent, or Firm*—Lyon & Lyon

[57] ABSTRACT

There is disclosed herein a voltage regulator for a power supply for load devices such as electronic photoflash units. The voltage regulator supplies power to charge the main capacitor of the photoflash unit to an appropriate voltage, and uses a semiconductor series regulator circuit. The voltage regulator provides medium-to-long term heat integration to terminate power supplied to the electronic flash unit in the event of a thermal overload in order to protect the electronic flash unit. The circuit includes a ready indicator to indicate when the main capacitor of the flash unit has reached the appropriate charge, and also includes an overload indicator to indicate an overload condition.

15 Claims, 3 Drawing Figures

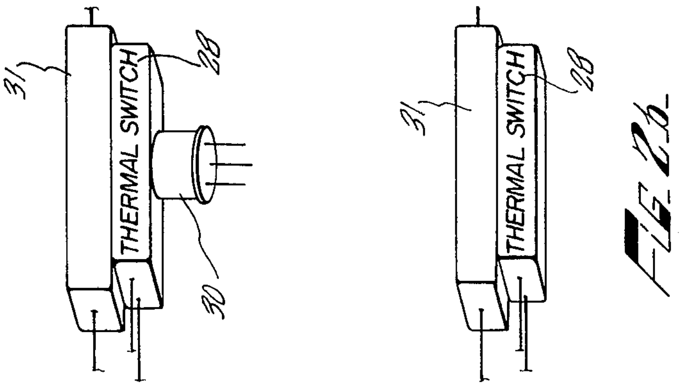
FIG. 2a
FIG. 2b
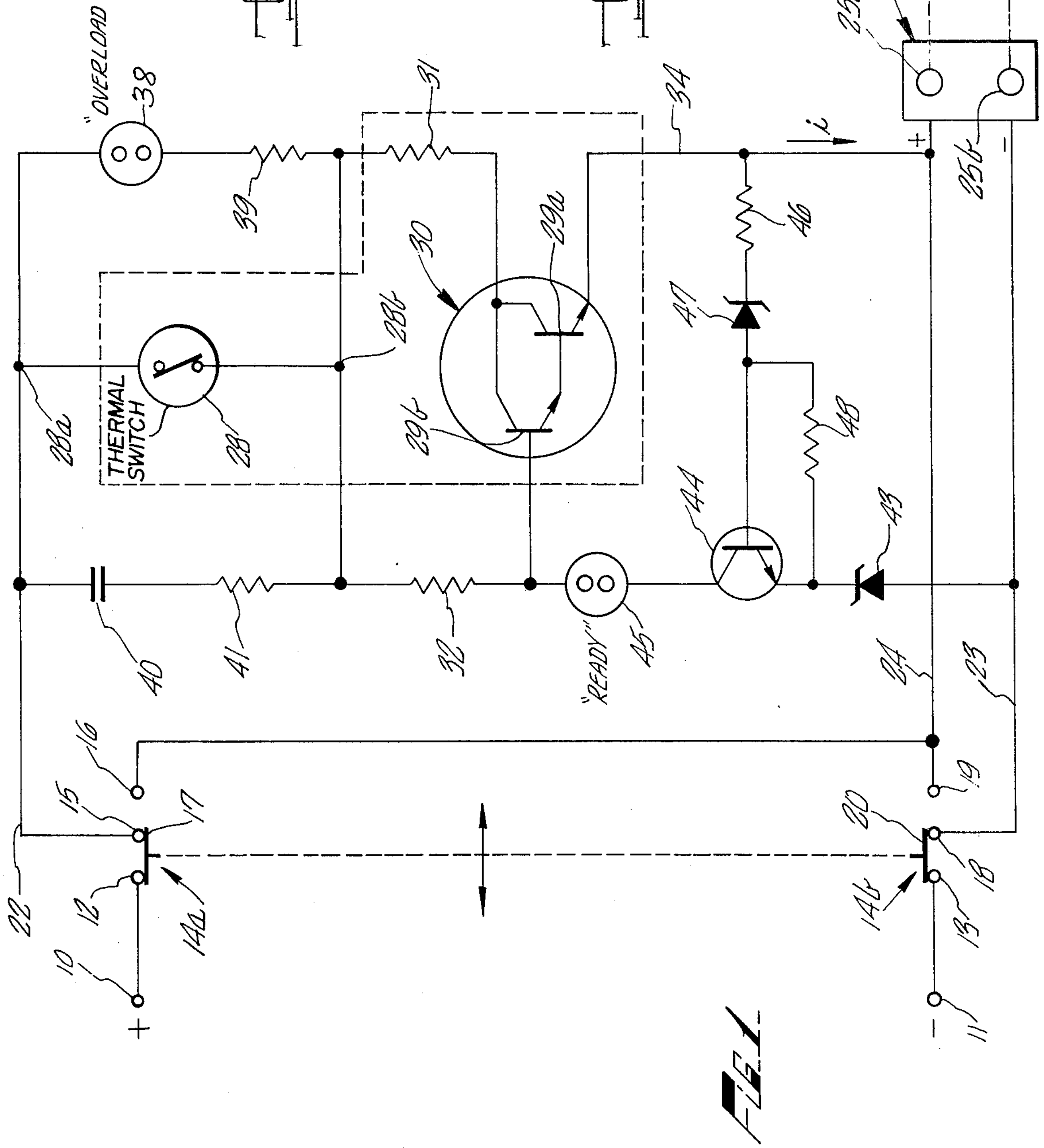
FIG. 1

VOLTAGE REGULATOR WITH THERMAL OVERLOAD PROTECTION

BACKGROUND OF THE INVENTION

The present invention relates to power supplies, and more particularly to a voltage regulator with thermal overload protection for use with electronic flash units.

Numerous types of electronic photoflash units currently are available, including manual and automatic types. In a typical automatic electronic photoflash unit, a relatively large main capacitor is used as the power source for the electronic flash tube. With the main capacitor suitably charged, the flash tube can be triggered, whereupon energy from the capacitor is dumped into the flash tube and causes the flash tube to emit light. In the automatic type unit, a light sensor circuit is provided which senses the light reflected from the subject being photographed, and when sufficient light has been received this circuit operates to extinguish light emission from the flash tube. In one class of electronic photoflash unit of the automatic type, a low resistance path is applied across the flash tube to thereby shunt the remaining capacitor energy therethrough. In another type, a switch is used in series with the flash tube, and when sufficient light has been received, this switch is turned off to thereby extinguish the flash of light.

Typical flash units of this nature include a built-in power supply with either disposable or rechargable batteries, along with an appropriate converter circuit for supplying a charging voltage to the main capacitor, which voltage typically is of the order of 330 volts dc. An example of a prior photoflash power supply using a series regulator between a dc source and main capacitor of a flash unit is shown in U.S. Pat. No. 3,819,893.

The usual rechargeable batteries have sufficient energy for exposing a roll or so of film, and then need to be recharged. Although present-day electronic flash units sometimes have a rapid charge capability for the rechargeable battery system, there are instances when photographers desire a portable power supply or battery pack which can be connected with the electronic flash unit, and which will provide the capability for more flash exposures. While such battery packs provide this capability, and the capability to rapidly recharge the main capacitor of the flash unit, they can damage the flash unit. When the photographer, using such a battery pack, takes a rapid sequence of pictures, because of the number of times the main capacitor of the flash unit is recharged over a short period of time, damage to the electronic flash unit may result easily.

SUMMARY OF THE INVENTION

Accordingly, the present invention provides a voltage regulator in the form of a portable power supply or battery pack which may be used with conventional electronic flash units and which includes a medium-to-long term heat integration feature to minimize the change of damage to the electronic flash unit. That is, the voltage regulator incorporates thermal overload protection for the electronic flash unit load rather than for the voltage regulator itself. This is accomplished in a series regulator circuit by causing the regulator to turn off if (a) the total current in (b) a given time reaches a potentially destructive level. This is accomplished through thermal coupling between one or several components of the series regulator and a thermal switch to provide a responsive action to the time average electrical charge sent to the flash unit.

BRIEF DESCRIPTION OF DRAWINGS

FIG. 1 is a circuit diagram of the voltage regulator of the present invention; and FIGS. *2a* and *2b* illustrate the manner in which certain of the components of the circuit of FIG. 1 are thermally coupled together.

DETAILED DESCRIPTION OF PREFERRED EMBODIMENT

Turning to FIG. 1, a preferred form of voltage regulator circuit is shown which includes terminals 10 and 11 adapted to be connected to the respective positive and negative terminals of a dc source (not shown), such as a 510 volt battery. These terminals may be connected in any suitable manner as by contact springs (not shown), and are in turn connected to respective terminals 12 and 13 of a conventional double-pole double-throw slide switch **14*a*–14*b*. The switch 14*a* includes additional terminals 15 and 16 and a metal slide contact 17, and the switch 14*b* has additional terminals 18 and 19 and a metal slide contact 20. The contacts 17 and 20 are ganged together. The switch 14*a*–14*b* is illustrated in the "on" position wherein terminals 12 and 15 are connected together and terminals 13 and 18 are connected together to thereby connect an upper line 22 to the positive terminal of the supply battery and a lower line 23 to the negative terminal of the supply battery. In the "off" position of the switch 14, terminals 16 and 17 are connected together, and terminals 18 and 19 are connected together, which connects lower line 23 with a line 24 and the upper line 22 with line 24 to thereby short together the terminals of an output plug 25** and short the input to the output of the circuit.

Switch terminal 15 is connected through the line 22 to an upper terminal **28*a* of a thermal switch 28, such as a Model "C" Thermostat, 75°C (EIA No. 516), manufactured by Portage Electric Products, Inc., the lower terminal 28b of which is connected through a load resistor 31 to the collectors of transistors 29*a* and 29*b* of a Darlington transistor amplifier 30 (such as a U2TD430), and connected through a biasing resistor 32 to the base of the transistor 29*b*. The emitter of the transistor 29*b* is internally connected to the base of the transistor 29*a*, and the emitter of the transistor 29*a* is connected to an output line 34 which is connected to the upper terminal 25*a* of the output plug 25. As will be apparent, the transistor 30** forms a series regulator.

Turning for the moment to FIG. *2a*, the same illustrates the physical arrangement of the transistor 30, the resistor 31 and the thermal switch 28. It will be seen that the case of the transistor 30 is disposed in contact with one surface of the thermal switch 28, and the resistor 31 is disposed in contact with another surface of the thermal switch 28. If the electronic flash unit with which the voltage regulator of FIG. 1 is used is fired in rapid sequence, the amount of current supplied to the flash unit in a short period of time can damage components of the flash unit, such as the main capacitor thereof. With the transistor 30 and the resistor 31 being physically joined and, therefore, thermally coupled to the thermal switch 28, as through use of a suitable adhesive, such as epoxy, the thermal switch 28 senses the heat generated by the two transistors **29*a*–29*b* of the transistor package 30, as well as the heat generated by the resistor 31**. The heat accumulated at these components is proportional to the load energy, and this physical arrangement provides a medium-to-long term integration of energy, or ampere-seconds, as indicated by the following equation:

$$\int_{o}^{t} i\,dt = Q = CV,$$ where the left-hand expression represents the integral over time, *t*, of current, *i*, through transistor 30, and CV (and Q) represents the charge stored in the flash main capacitor.

The thermal switch 28 can be selected to open at a given temperature and, thus, the same will open when a given amount of energy (such as, 30 times, 0.5 ampere-seconds in 2 minutes) has been applied to the electronic flash unit. The thermal switch 28 itself does not load the circuit when closed, and after it opens as a result of an overload it automatically resets (closes) following a suitable cooling period (such as, a few minutes). It will be apparent that different flash units may be able to accommodate different energy levels without destruction of the components thereof and, thus, the circuit constants and temperature-opening level of the thermal switch 28 can be selected as desired or for an average energy level or for a particular energy level for a given flash unit. Specific examples of the other components of the circuit are given later.

FIG. **2*b* shows an alternative arrangement which also has been found suitable. In this embodiment, only the resistor 31 is in physical and thermal contact with the thermal switch 28. The current through the resistor 31** is integrated according to the above equation.

Turning again to the circuit of FIG. 1, a neon lamp 38 and resistor 39 are connected in series between the line 22 and the resistor 31 and, thus, are connected in parallel with the thermal switch 28. The neon lamp 38 is caused to turn on whenever the thermal switch 28 opens. A capacitor 40 and resistor 41 are connected across the thermal switch 28 to minimize the effects of transients, upon operation of the switch 28, on the circuit.

The terminal 18 of the switch 14b is connected through the line 23 to the lower terminal 25b of the output plug 25 as noted earlier. The line 23 also is connected through a zener diode 43, emitter-collector path of a transistor 44 and neon "ready" lamp 45 to the base of transistor **29*b*. The output line 34 of the series regulator is connected through a resistor 46 and a zener diode 47 to the base of the transistor 44, and a resistor 48 is connected between the emitter and base of the transistor 44. These components form a feedback circuit for the series regulator. The transistor 44 functions to fire the neon lamp 45** and thereby provide a "ready" indication when the main capacitor voltage of the flash unit is at the correct level, thereby indicating a sufficient charge for firing the flash tube of the flash unit.

Until the nominal voltage is reached by the main capacitor of the electronic flash unit coupled with the output plug 25, a maximum amount of current from the supply battery connected to terminals 10-11 is used to charge the main capacitor of the flash unit so that the same charges rapidly. The series regulator operates in a relatively conventional manner in controlling the current supplied to the main capacitor as the same becomes changed, although the series circuit arrangement of the thermal switch 28 along with the physical arrangement of the series regulator and thermal switch provide a significant new improvement for protection of the flash unit load.

The zener diodes 43 and 47 are arranged in the circuit to cause the voltage across the main capacitor of the flash unit to be clamped through resistor 46 by these zener diodes 43 and 47 and the emitter-base diode junction of transistor 44 even if the case of the transistor 30 leaks. When the capacitor of the flash unit is fully charged, the transistor 30 should be completely off and it should be zero or very small; however, there is a leakage current through this transistor since it is not a perfect switch. The diodes 43 and 47 and the emitter-base diode of transistor 44 establish a clamping voltage, without which the leakage current would continue to charge the capacitor of the flash unit above the assigned voltage thereof, particularly in the case of high leakage which can occur as a result of a weak transistor 30 or the transistor 30 reaching a high temperature.

The use of a feedback series regulator circuit assures the fastest possible recycling time for the electronic flash unit; that is, fast charging of the main capacitor. However, as noted earlier, excessive recharging of the capacitor over a short period of time can be destructive of the capacitor or flash tube, or other components of the electronic flash unit. The thermal coupling of the thermal switch 28 to cause it to respond to the time average electrical charge applied to the flash unit, and to thereby open if the total amperes-seconds reaches a dangerous level, obviates the potential damage to the flash unit, and the arrangement of the zener diodes 43 and 47 additionally provide voltage overload protection for the main capacitor of the flash unit.

Exemplary values for other components of the circuit of FIG. 1 are: resistor 31 — 300 ohms, 3W; resistor 32 — 180 K, ¼W; resistor 39 — 820 K, ¼W; resistor 41 — 100 ohms, ¼W; resistor 46 — 47 K, ¼W; resistor 48 — 4.7 K, ¼W; capacitor 40 — .01 ; transistor 44 — 2N5175; diode 43 — 160 V, ¼W; and diode 47 — 170 V, ¼W.

While embodiment and an application of this invention have been shown and described, it will be apparent to those skilled in the art that modifications are possible without departing from the inventive concepts herein described.

What is claimed is:

1. A voltage regulator for charging the main capacitor of an electronic flash unit and for preventing the application of energy to the flash unit when the time average electrical charge applied to the flash unit reaches a potentially damaging level for the flash unit, comprising

- a pair of input terminals adapted to be connected to a dc voltage source,
- a pair of output terminals adapted to be connected to an electronic flash unit for supplying charging energy to the main capacitor thereof,
- circuit means connecting said input terminals with said output terminals, said circuit means including semiconductor feedback regulator circuit means and a thermal switch means connected in series between one of said input terminals and one of said output terminals, said regulator circuit means including at least one current carrying series component in thermal contact with said thermal switch means for sensing accumulated heat to thereby provide time integration of current supplied through said regulator circuit means and to cause said thermal switch means to open if a predetermined amount of energy is applied to an electronic flash unit connected with said output terminals.

2. A voltage regulator as in claim 1 wherein
said current carrying series component comprises a semiconductor regulator.

3. A voltage regulator as in claim 1 wherein
said current carrying series component is a load resistance.

4. A voltage regulator as in claim 1 wherein
said semiconductor feedback regulator circuit means includes a transistor regulator and a load resistor in thermal contact with said thermal switch means.

5. A voltage regulator as in claim 1 wherein
said semiconductor feedback regulator circuit means includes transistor means connected in series with a load resistance, this series combination being connected in series with said thermal switch means, said load resistance being in thermal contact with said thermal switch means, and
said regulator circuit means including feedback circuit means connected between one of said output terminals and said transistor means.

6. A voltage regulator as in claim 5 wherein
said feedback circuit means includes a pair of diodes and means connecting said diodes across said output terminals, and includes a junction intermediate said diodes connected through semiconductor means to said transistor means for supplying a feedback signal to said to said transistor means.

7. A voltage regulator as in claim 6 wherein
said feedback circuit means includes indicator means for indicating when the voltage across said output terminals reaches a given level.

8. A voltage regulator as in claim 1 wherein
said semiconductor feedback regulator circuit means includes transistor means connected in series with a load resistance, this series combination being connected in series with said thermal switch means, and said transistor means and said load resistance being in thermal contact with said thermal switch means.

9. A voltage regulator as in claim 1 including
overload indicator means connected in parallel with said thermal switch means.

10. A voltage regulator for charging the main capacitor of an electronic flash unit and for preventing the application of energy to the flash unit when the time average electrical charge applied to the flash unit reaches a potentially damaging level for the flash unit, comprising
a pair of input terminals adapted to be connected to a dc voltage source,
a pair of output terminals adapted to be connected to an electronic flash unit for supplying charging energy to the main capacitor thereof,
circuit means connecting said input terminals with said output terminals, said circuit means including semiconductor feedback regulator circuit means and a thermal switch means connected in series between one of said input terminals and one of said output terminals, said regulator circuit means including transistor means connected in series with a load resistance, this series combination being connected in series with said thermal switch means, and said transistor means being in thermal contact with said thermal switch means, for sensing accumulated heat to thereby provide time integration of current supplied through said regulator circuit means and to cause said thermal switch means to open if a predetermined amount of energy is applied to an electronic flash unit connected with said output terminals, and
said regulator circuit means including feedback circuit means connected between one of said output terminals and said transistor means.

11. A voltage regulator as in claim 10 wherein
said feedback circuit means includes diode means and means connecting said diode means across said output terminals.

12. A voltage regulator for charging the main capacitor of an electronic flash unit and for preventing the application of energy to the flash unit when the time average electrical charge applied to the flash unit reaches a potentially damaging level for the flash unit, comprising
a pair of input terminals adapted to be connected to a dc voltage source,
a pair of output terminals adapted to be connected to an electronic flash unit for supplying charging energy to the main capacitor thereof,
circuit means connecting said input terminals with said output terminals, said circuit means including semiconductor feedback regulator circuit means and a thermal switch means connected in series between one of said input terminals and one of said output terminals, said regulator circuit means including transistor means connected in series with a load resistor, this series combination being connected in series with said thermal switch means, and said load resistor being in thermal contact with said thermal switch means for sensing accumulated heat to thereby provide time integration of current supplied through said regulator circuit means and to cause said thermal switch means to open if a predetermined amount of energy is applied to an electronic flash unit connected with said output terminals, and
said regulator circuit means including feedback circuit means connected between one of said output terminals and said transistor means.

13. A voltage regulator as in claim 12 wherein
said feedback circuit means includes diode means and means connecting said diode means across said output terminals.

14. A voltage regulator for charging the main capacitor of an electronic flash unit and for preventing the application of energy to the flash unit when the time average electrical charge applied to the flash unit reaches a potentially damaging level for the flash unit, comprising
a pair of input terminals adapted to be connected to a dc voltage source,
a pair of output terminals adapted to be connected to an electronic flash unit for supplying charging energy to the main capacitor thereof,
circuit means connecting said input terminals with said output terminals, said circuit means including semiconductor feedback regulator circuit means and a thermal switch means connected in series between one of said input terminals and one of said output terminals, said regulator circuit means including transistor means connected in series with a load resistance, this series combination being connected in series with said thermal switch means, and said transistor means and load resistance being in thermal contact with said thermal switch means for sensing accumulated heat to thereby provide time integration of current supplied through said regulator circuit means and to cause said thermal switch means to open if a predetermined amount of energy is applied to an electronic flash unit connected with said output terminals, and said regulator circuit means including feedback circuit means connected between one of said output terminals and said transistor means.

15. A voltage regulator as in claim 14 wherein said feedback circuit means includes diode means and means connecting said diode means across said output terminals.

* * * * *